United States Patent
Itskovich et al.

(10) Patent No.: US 9,297,921 B2
(45) Date of Patent: Mar. 29, 2016

(54) DTEM WITH SHORT SPACING FOR DEEP, AHEAD OF THE DRILL BIT MEASUREMENTS

(75) Inventors: Gregory B. Itskovich, Houston, TX (US); Arcady Reiderman, Houston, TX (US); Michael B. Rabinovich, Houston, TX (US); Sergey Martakov, Spring, TX (US); Emma Iomdina, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1083 days.

(21) Appl. No.: 13/220,363

(22) Filed: Aug. 29, 2011

(65) Prior Publication Data
US 2012/0059586 A1    Mar. 8, 2012

Related U.S. Application Data

(60) Provisional application No. 61/379,979, filed on Sep. 3, 2010.

(51) Int. Cl.

| | |
|---|---|
| G01V 1/40 | (2006.01) |
| G01V 3/08 | (2006.01) |
| G01V 3/10 | (2006.01) |
| G01V 3/00 | (2006.01) |
| G01V 3/28 | (2006.01) |
| E21B 47/00 | (2012.01) |
| E21B 47/10 | (2012.01) |
| E21B 41/00 | (2006.01) |

(52) U.S. Cl.
CPC .............. *G01V 3/28* (2013.01); *E21B 41/0092* (2013.01); *E21B 47/00* (2013.01); *E21B 47/10* (2013.01)

(58) Field of Classification Search
CPC ............ G01V 1/30; G01V 3/28; E21B 47/00; E21B 47/10; E21B 41/0092
USPC ................... 702/2, 6, 7, 9; 324/331, 339, 346
See application file for complete search history.

(56) References Cited

U.S. PATENT DOCUMENTS

| | | |
|---|---|---|
| 7,031,839 B2 | 4/2006 | Tabarovsky et al. |
| 7,150,316 B2 | 12/2006 | Itskovich |
| 7,167,006 B2 | 1/2007 | Itskovich |
| 7,994,790 B2 | 8/2011 | Itskovich et al. |
| 7,994,791 B2 | 8/2011 | Hall et al. |
| 8,008,919 B2 | 8/2011 | Wang et al. |
| 8,035,392 B2 | 10/2011 | Itskovich et al. |
| 8,049,507 B2 | 11/2011 | Rabinovich et al. |
| 2005/0140374 A1* | 6/2005 | Itskovich ...................... 324/339 |
| 2007/0070809 A1 | 3/2007 | Hurst et al. |
| 2007/0216416 A1 | 9/2007 | Itskovich |
| 2009/0082969 A1* | 3/2009 | Rabinovich et al. .............. 702/7 |
| 2010/0109672 A1 | 5/2010 | Rabinovich et al. |
| 2010/0134111 A1* | 6/2010 | Itskovich ...................... 324/338 |
| 2011/0166842 A1* | 7/2011 | Banning-Geertsma et al. .. 703/6 |

* cited by examiner

*Primary Examiner* — An Do
(74) *Attorney, Agent, or Firm* — Mossman Kumar & Tyler PC

(57) ABSTRACT

A transmitter on a bottomhole assembly (BHA) is used for generating a transient electromagnetic signal in an earth formation. A processor estimates the distance to a resistivity interface using a signal produced by a receiver on the BHA. The transmitter-receiver distance may be less than 1 m. The estimation of the distance is done in real time using a thin conductive sheet approximation.

19 Claims, 10 Drawing Sheets

DTEM WITH SHORT SPACING FOR DEEP, AHEAD OF THE DRILL BIT MEASUREMENTS

CROSS-REFERENCES TO RELATED APPLICATIONS

This application claims priority from the U.S. Provisional Application Ser. No. 61/379,979 filed on Sep. 3, 2010, incorporated herein by reference in its entirety.

BACKGROUND OF THE DISCLOSURE

1. Field of the Disclosure

The disclosure relates to the field of electromagnetic induction well logging. More specifically, the present disclosure is a method of and an apparatus for making deep resistivity measurements ahead of the drill bit using transient electromagnetic signals.

2. Description of the Related Art

In transient electromagnetic (TEM) methods, voltage or current pulses that are excited in a transmitter initiate the propagation of an electromagnetic signal in the earth formation. Electric currents diffuse outwards from the transmitter into the surrounding formation. At different times, information arrives at the measurement sensor predominantly from different investigation depths. Particularly, at a sufficiently late time, the transient electromagnetic field is sensitive mainly to remote formation zones and only slightly depends on the resistivity distribution in the vicinity of the transmitter.

It is highly desirable to have short spacing MWD/LWD system with minimum number of sensors for deep ahead of the bit resistivity measurements due to multiple operational reasons. Unfortunately, conventional induction low frequency measurements can provide the increased depth of investigation only with increasing the transmitter/receiver spacing. The obvious price for the increased depth of investigation is the significantly lower signals due to the lower frequency and larger spacing. For the ahead of the bit measurement there is another disadvantage of using long spacing—moving the sensors away from the target reduces the sensitivity of the measurement to the ahead of the bit target.

The present disclosure is directed to making deep (greater than 10 meters) transient electromagnetic (DTEM) measurements using a short spacing of the transmitters and receivers that has real-time interpretation capability.

SUMMARY OF THE DISCLOSURE

One embodiment of the disclosure is an apparatus for evaluating an earth formation. The apparatus includes a carrier configured to be conveyed in a borehole; a transmitter on the carrier configured to produce a transient electromagnetic field in the earth formation; a receiver on the carrier positioned at a first distance from the transmitter configured to produce a first signal responsive to an interaction of the electromagnetic field with the earth formation, the first signal being affected by a resistivity interface at a second distance from the transmitter; the second distance being at least five times the first distance; and a processor configured to estimate from the first signal a value of the second distance.

Another embodiment of the disclosure is a method of evaluating an earth formation. The method includes: using a transmitter on a carrier in a borehole for producing a transient electromagnetic field in the earth formation; using a receiver on the carrier positioned at a first distance from the transmitter for producing a first signal responsive to an interaction of the electromagnetic field with the earth formation, the first signal being affected by a resistivity interface at a second distance from the transmitter, the second distance being at least five times the first distance; and using a processor for estimating from the first signal a value of the second distance.

Another embodiment of the disclosure is a non-transitory computer-readable medium product having stored thereon instructions that when read by a processor cause the processor to execute a method. The method includes: estimating a distance of a resistivity interface from a bottomhole assembly (BHA) in an earth formation using a transient electromagnetic (TEM) signal produced by a receiver on the BHA responsive to a TEM field produced by a transmitter on a carrier in a borehole wherein a distance from the transmitter to the interface is at least five times the distance from the transmitter to the receiver.

Another embodiment of the disclosure is an apparatus for evaluating an earth formation. The apparatus includes: a carrier configured to be conveyed in a borehole; a transmitter on the carrier configured to produce a transient electromagnetic field in the earth formation; a receiver on the carrier configured to produce a signal responsive to an interaction of the electromagnetic field with the earth formation, the produced signal being affected by at least one layer in the earth formation; and a processor configured to estimate from the produced signal a value of a distance to an upper surface of the at least one layer and a conductivity of the at least one layer using a thin conductive sheet approximation.

Another embodiment of the disclosure is a method of evaluating an earth formation. The method includes: using a transmitter on a carrier conveyed in a wellbore for producing a transient electromagnetic field in the earth formation; using a receiver on the carrier for producing a signal responsive to an interaction of the electromagnetic field with the earth formation, the produced signal being affected by at least one layer in the earth formation; and estimating from the produced signal a value of a distance to an upper surface of the at least one layer and a conductivity of the at least one layer using a thin conductive sheet approximation.

Another embodiment of the disclosure is a non-transitory computer-readable medium product having stored thereon instructions that when read by a processor cause the processor to execute a method. The method includes: estimating a distance of a resistivity interface from a bottomhole assembly (BHA) in an earth formation using a transient electromagnetic (TEM) signal produced by a receiver on the BHA responsive to a TEM field produced by a transmitter on a carrier in a borehole; wherein a thin conducting sheet approximation is used in the estimation.

BRIEF DESCRIPTION OF THE DRAWINGS

The present disclosure is best understood with reference to the attached drawings in which like numerals refer to like elements, and in which.

DESCRIPTION OF SPECIFIC EMBODIMENTS

Figure 1:
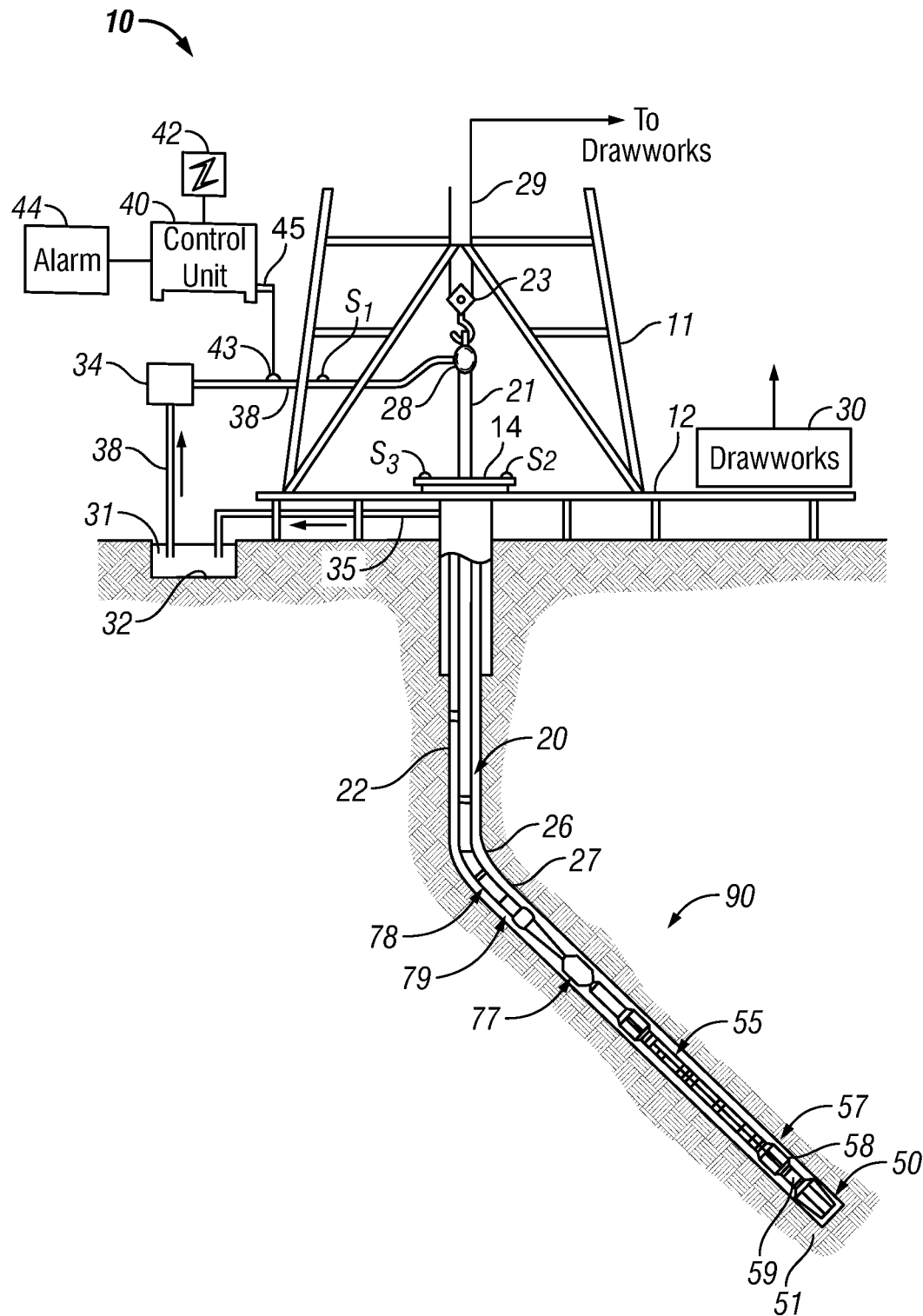
FIG. 1 shows the overall configuration of a measurement-while-drilling system incorporating the present disclosure.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ may be placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 may include a computer or a microprocessor-based processing system, memory for storing programs or models and data, a recorder for recording data, and other peripherals. The control unit may be adapted to activate alarms 44 when certain unsafe or undesirable operating conditions occur.

Figure 2:
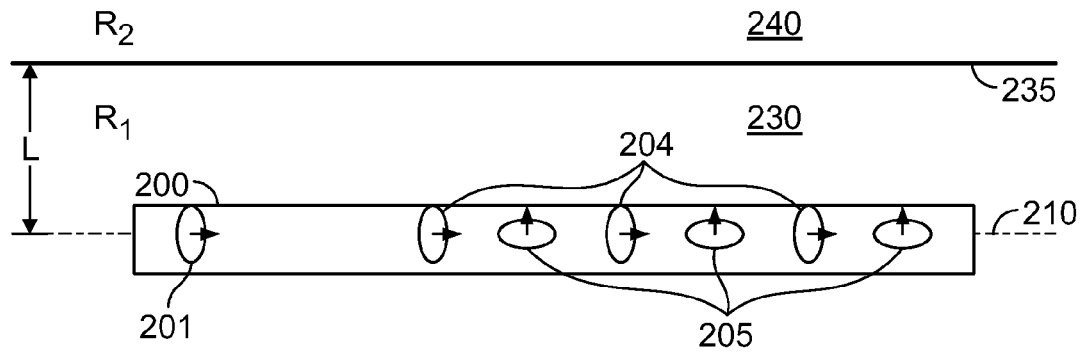
FIG. 2 shows a schematic of an exemplary DTEM tool and its trajectory.

FIG. 2 shows an exemplary DTEM tool. A transmitter coil 201 and a receiver coil assembly are positioned along a damping portion 200 of drill pipe for suppressing an eddy current. The longitudinal axis of the drill tool defines a Z-direction of a coordinate system. An X-direction is defined so as to be perpendicular to the longitudinal axis of the drill tool. Damping portion 200 of the drill pipe is of length sufficient to interrupt a flow of eddy currents. Transmitter coil 201 induces a magnetic moment. In the illustration of FIG. 2, for instance, the transmitter coil 201 is oriented to induce a magnetic moment along the Z-direction. The receiver coil assembly comprises an array of Z-oriented 204 and X-oriented 205 coils having magnetic moments oriented so as to detect induced magnetic moments along orthogonal directions (i.e., $M_x$, $M_z$). With a conductive pipe without a damping portion, eddy currents produced in transient field measurements can make circumferential circuits coinciding with the pipe surface. The eddy currents produced from a Z-transmitter can live for a long time and typically have the longest possible rate of decay of all signals. Longitudinal cuts force the eddy currents to follow high resistivity path instead of circumferential circuits, thereby inducing a quicker rate of decay of the eddy currents. Inducing a fast decay of the eddy currents in the pipe enables improved measurements of the transient electromagnetic components. Such improvements enable improved determination of information, for instance, about positions of oil/water boundaries and resistivity of the surrounding formation.

Although FIG. 2 illustrates one configuration of transmitter and receiver, a variety of transmitter receiver configurations can be used in the present disclosure. In a first embodiment of the MWD transient tool, a Z-directed transmitter coil can be positioned along the damping portion, and a receiver coil pair comprising an X-directed a Z-directed receiver coil pair is axially displaced from the Z-directed transmitter coil. The receiver pair is typically placed at a distance of from 0 m to 10 m from the transmitter, also on the damping portion. A transmitter-receiver distance less than approximately 2 m further enables geosteering. The term geosteering refers to control of the drilling direction of the BHA based upon determined distances from an interface in the earth formation. Typically, in geosteering, it is desired to maintain the drilling of the borehole at a desired depth below a fluid interface such as an oil/water, gas/oil or gas/water interface. Alternatively, geosteering may be used to maintain the wellbore within a reservoir rock at a desired distance from the caprock.

Figure 3:
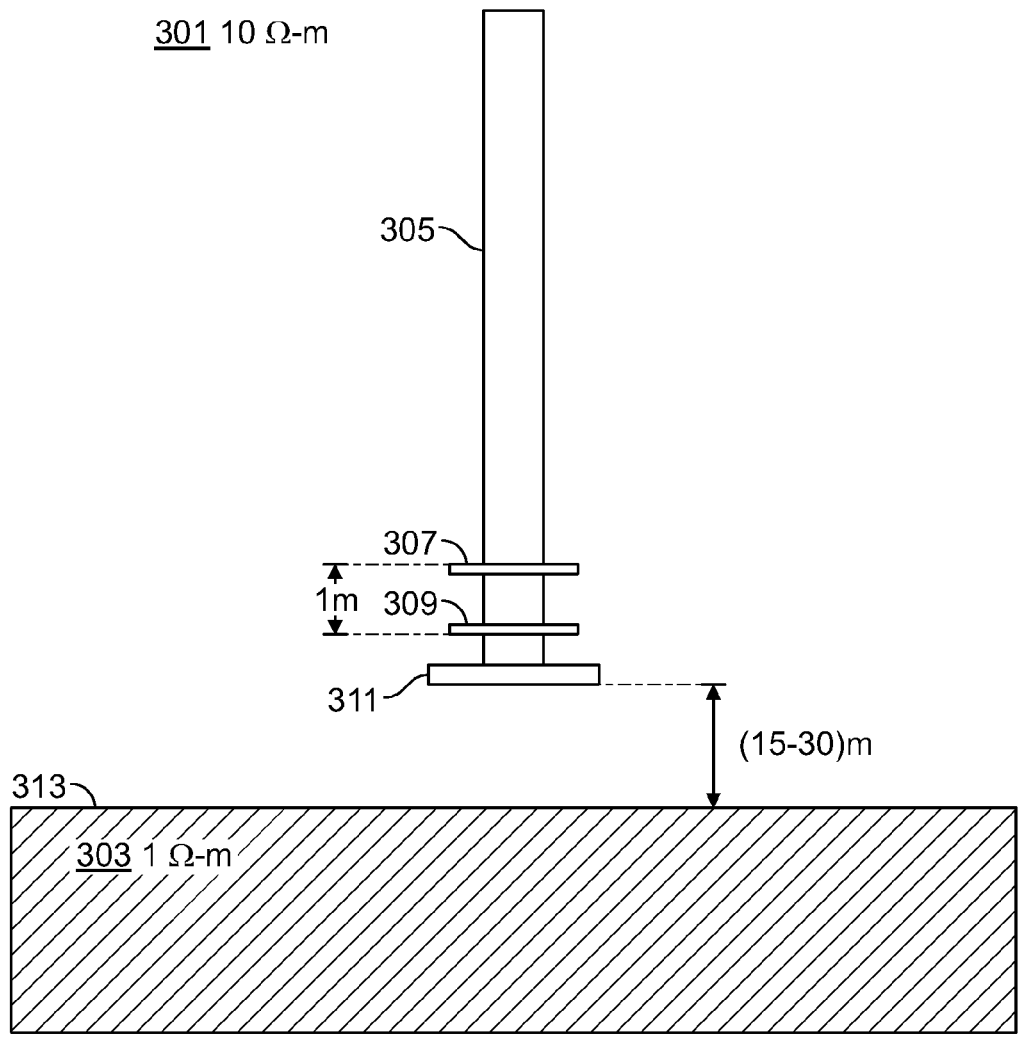
FIG. 3 shows a model used to illustrate the present disclosure.

A model used to illustrate an embodiment of the present disclosure is shown in FIG. 3. A drillstring 305 is shown in a resistive formation 301 having a resistivity of 10 Ω-m. The BHA is provided with a transmitter 309 and a receiver 311. The separation of the transmitter and the receiver is around 1 m, defining a short instrument. The drill bit 311 is typically at a distance of 15-30 m, defining a device with deep look ahead capability, from the top 313 of a conductive formation 303 having a resistivity of 1 Ω-m. The transmitter and the receiver both have axially oriented (z-) coils. For a short tool, the spacing between the transmitter 309 and the receiver 311 should be substantially less (one fifth, or even one order of magnitude smaller) than the distance to the layer being identified. For the purposes of the present disclosure, the BHA may be referred to as a carrier.

In general, in transient electromagnetic measurements the current in the transmitting coil vanishes from some initial value to zero and induced transient signal is measured in the receiver. The induced in the formation currents (eddy currents) begin diffusion from the region close to the transmitter coil in all the directions surrounding the transmitter. The induced in the formation currents induce the electromagnetic field which is measured by the receiving coil. The early stage of the transient signal is linked to the electrical properties of the formation which is close to the transmitter, while late stage to the far-located formation.

In the description below we show that sensitivity of the short transient electromagnetic system to the ahead-placed target is higher compared to sensitivity of the traditional induction measurements. Moreover, it is shown that for the transient system the uncertainty in the distance to the target goes down with spacing reduction.

To quantify numerically a sensitivity value of the transient signal $\epsilon(t)$ with respect to the distance d normalized partial derivatives of $\epsilon(t)$ with respect to the normalized distance to the boundary d are used:

$$\eta_d^\epsilon(t) = \frac{\Delta\varepsilon(t)}{\varepsilon(t)} \frac{d}{\Delta d}, \qquad (1)$$

where $\Delta\epsilon(t)$ is the difference between two signals $\epsilon(t)$ corresponding to the two different positions of the boundary (for example, at 15 and 30 m) and $\epsilon d/d$ is the relative change in the distance (for example, (30 m−15 m)/15 m=1). In case of frequency measurements the same formula (1) is used, but $\epsilon(t)$ is replaced with $\epsilon(\omega)$.

Figure 4:
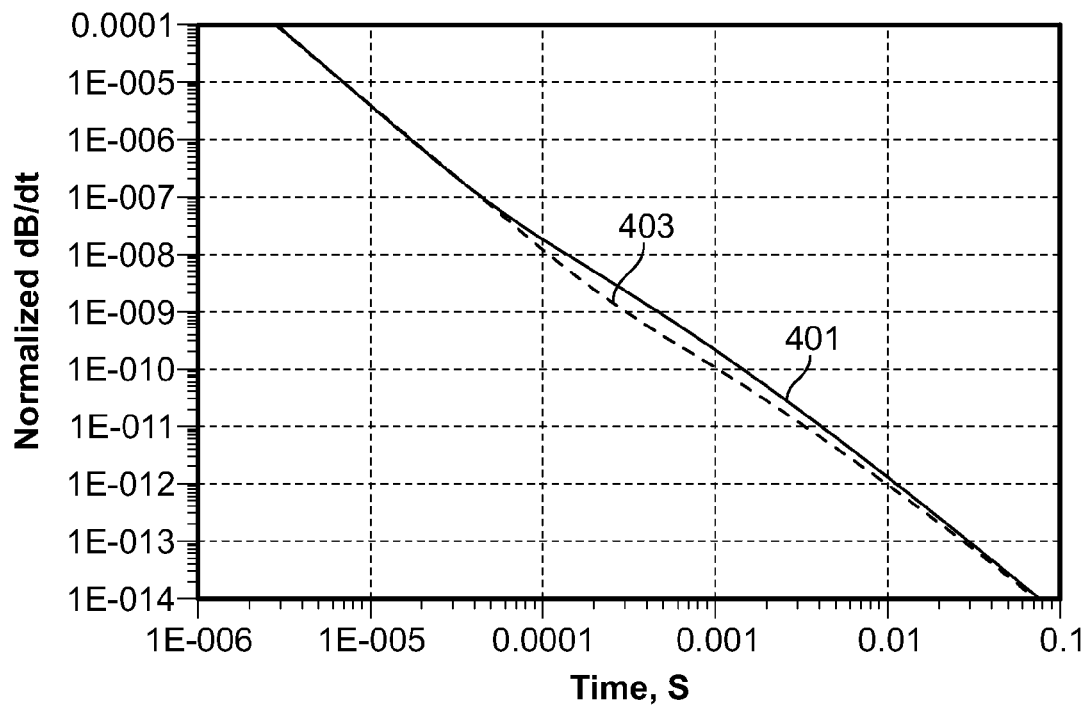
FIG. 4 shows the resolution of the transient signal with a R/T spacing of 1 m.

In FIG. 4 modeling results of signals measured for a short 1 m transient system are shown. Two transient curves in FIG. 4 correspond to the boundary position of 15 401 and 30 m 405 ahead. As can be seen from FIG. 4, at early times below 10 µs, when measured signal $\epsilon(t)$ is mainly sensitive to the resistivity of resistive layer, the two curves overlap. At the later times the sensitivity to the ahead of the bit boundary is increased and reaches its maximum value in the time interval between 200 and 500 µs (maximum deviation between two curves). The late stage of the transient process is characterized by reduced sensitivity to the boundary location and increased sensitivity to the resistivity of the bottom layer.

Figure 5:
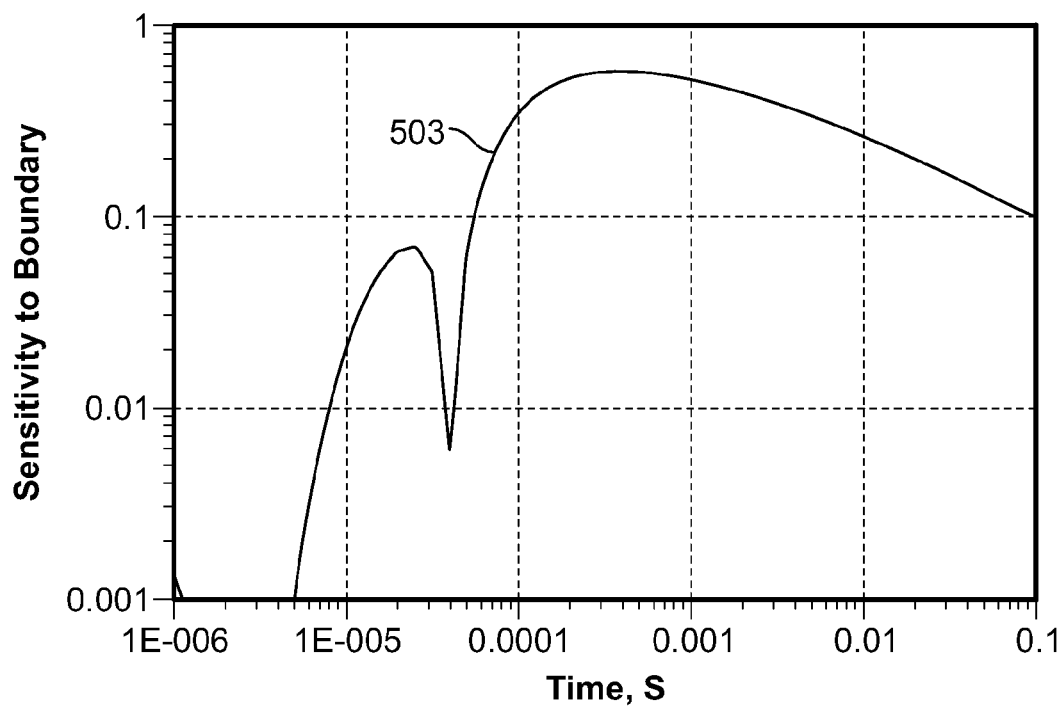
FIG. 5 shows the sensitivity of the transient signal with a R/T spacing of 1 m.

The variation of sensitivity is seen in FIG. 5 where the sensitivity function $\eta_d^\epsilon(t)$ 501 calculated according to eqn, (1) is shown. As can be seen, the maximum of the sensitivity function is approaching the value of 0.6. This value suggests that the relative error $$\frac{\Delta d}{d}$$

in defining distance to the boundary will be 1.67 times bigger than the relative error in the measured data $$\frac{\Delta \varepsilon(t)}{\varepsilon(t)}.$$

Indeed, $$\frac{d}{\Delta d} = \frac{\Delta\varepsilon(t)}{\varepsilon(t)} \frac{1}{\eta_d^\epsilon(t)} = \frac{1}{0.6} \cdot \frac{\Delta\varepsilon(t)}{\varepsilon(t)} \qquad (2)$$

Based on the resolution and sensitivity analysis, it is thus possible to design a DTEM tool that operates in a time interval between 10 µs and 10 ms with a transmitter-receiver spacing of 5 m or less that is able to estimate the distance to a bed boundary at least five times the transmitter-receiver spacing. A tool with a transmitter and receiver at the same location and the ability to see at least 10 m into the formation is also possible.

Figure 6:
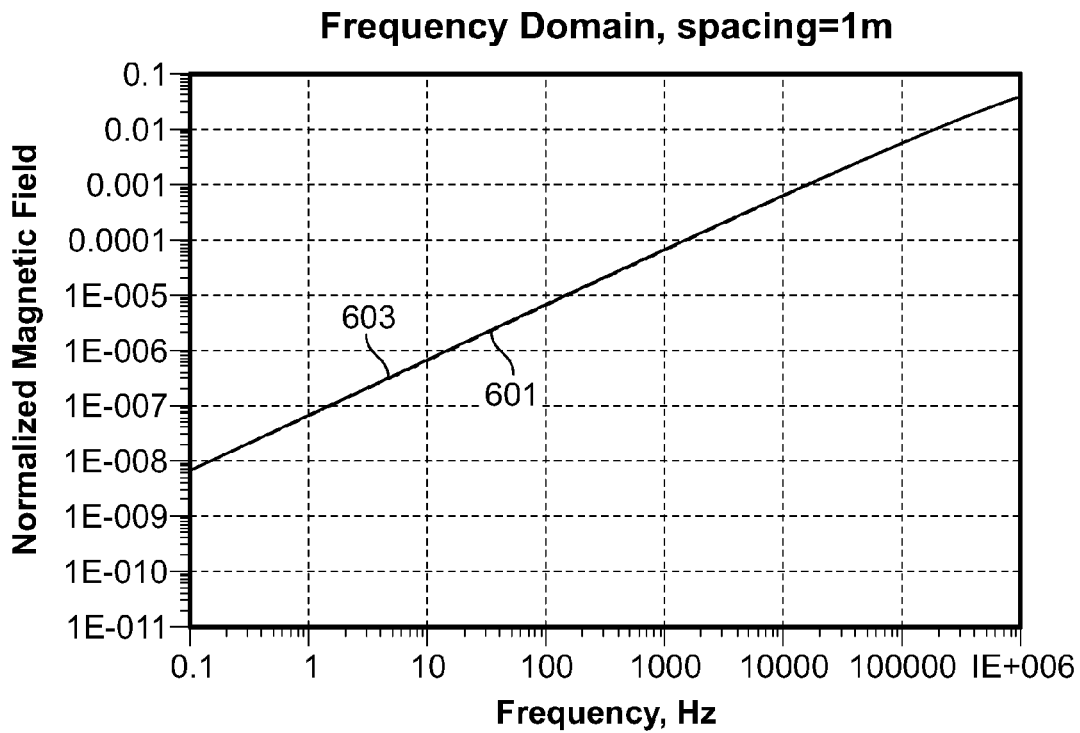
FIG. 6 shows the resolution of frequency domain data with a R/T spacing of 1 m.

A similar analysis may be carried out for frequency domain induction tools. Results of a resolution analysis for a frequency domain are shown next in FIG. 6. Shown is the magnetic induction B(ω) data (imaginary component) as a function of frequency when the receiver coil is also placed at the distance L=1 m from transmitter. As can be seen, the curves corresponding to 15 601 and 30 m 603 distance to boundary position are virtually indistinguishable, which suggests no sensitivity to the boundary ahead at these deep distances.

Figure 7:
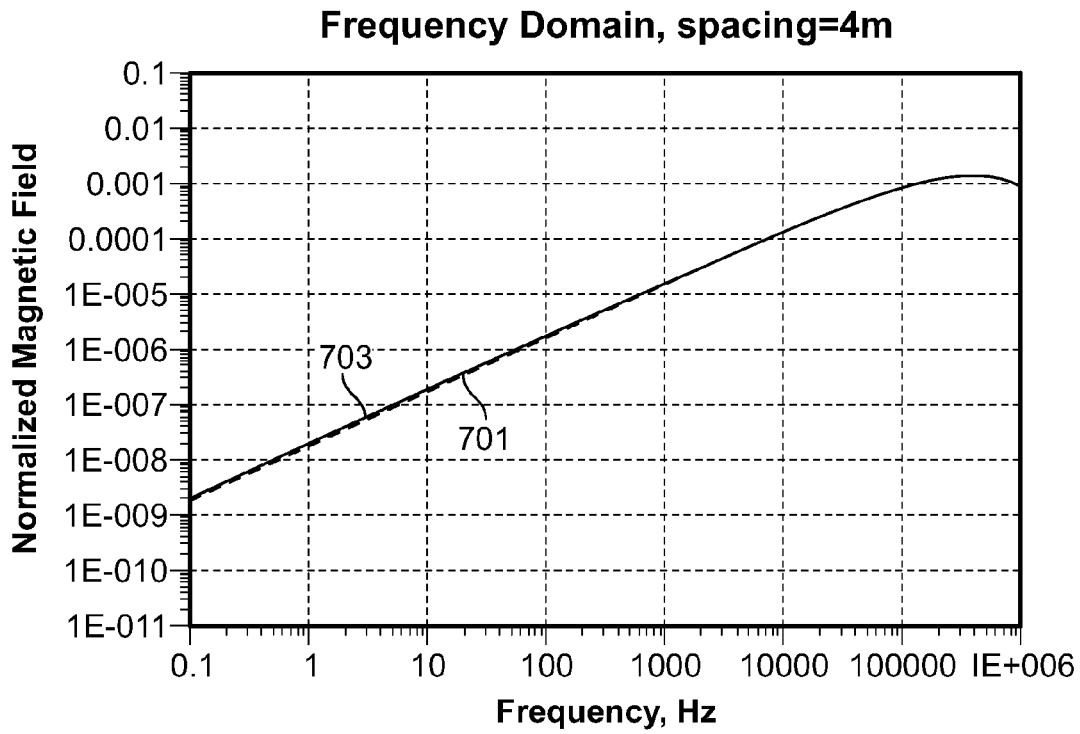
FIG. 7 shows the resolution of frequency domain data with a R/T spacing of 4 m.
Figure 8:
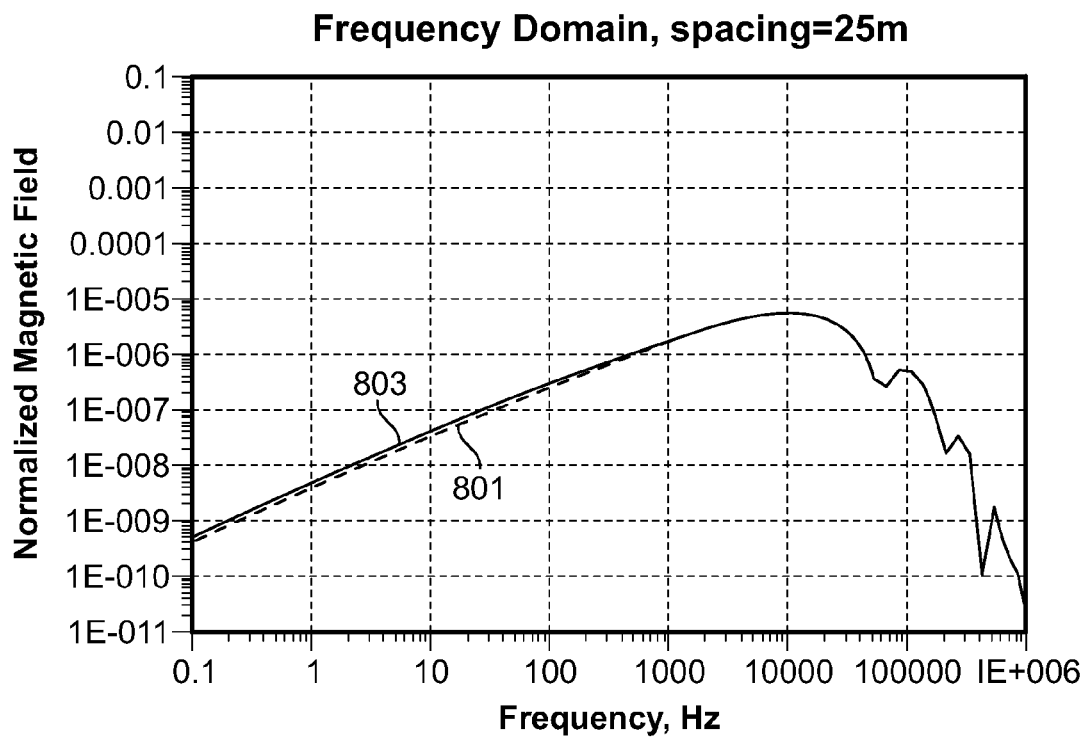
FIG. 8 shows the resolution of frequency domain data with a R/T spacing of 25 m.

The situation is not improved much when spacing is increased to 4 m (see FIG. 7), although some resolution at the frequency below 100 Hz is observed between 701 for 1 15 m distance and 703 for a 30 m distance. By increasing spacing to 25 m (FIG. 8) we further boost sensitivity to the boundary and see some separation between the 15 m distance 801 and the 30 m distance 805. Nevertheless, the resolution of the short-spaced transient system seen in FIG. 4 cannot be matched.

Figure 9:
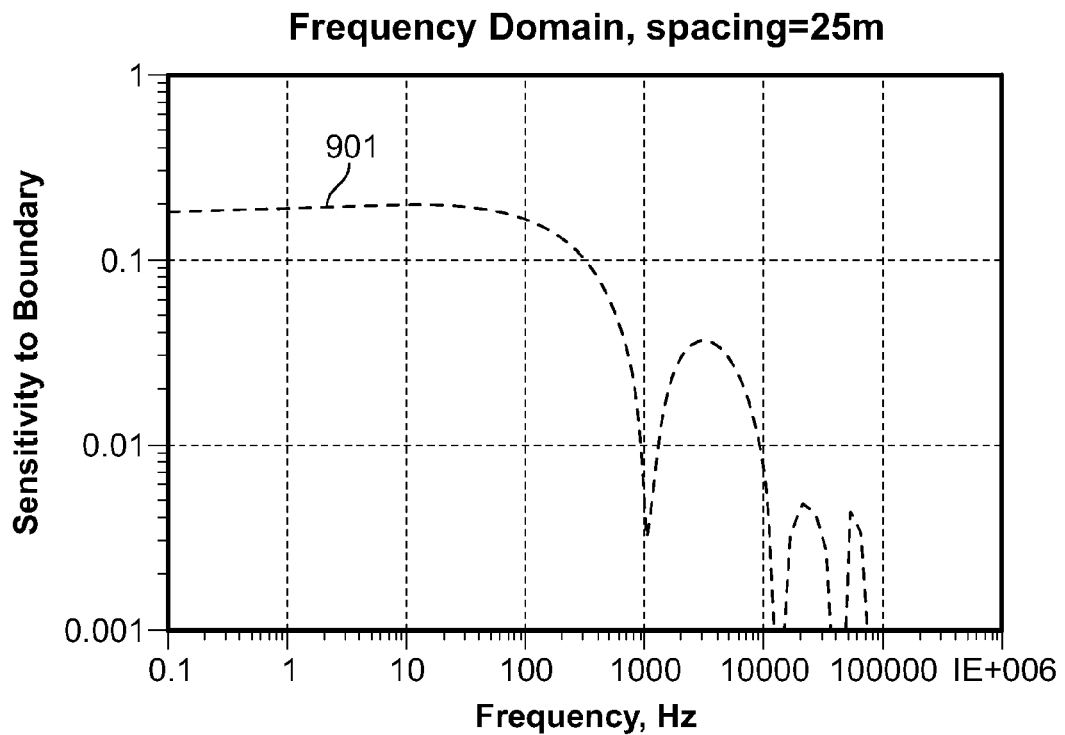
FIG. 9 shows the sensitivity of frequency domain data with a R/T spacing of 25 m.

By applying eqn. (1) to the frequency data, the sensitivity of the 25 m spacing arrangement is calculated results are presented in FIG. 9. As can be seen from 901 in FIG. 9, the best sensitivity for this frequency domain measurement is observed at 100 Hz and is about 0.2. This is less than one third the corresponding sensitivity of the transient signal at the short spacing. For 2 kHz measurements the sensitivity of the frequency domain tool is around 5% of the sensitivity of the short spacing transient system.

Figure 10:
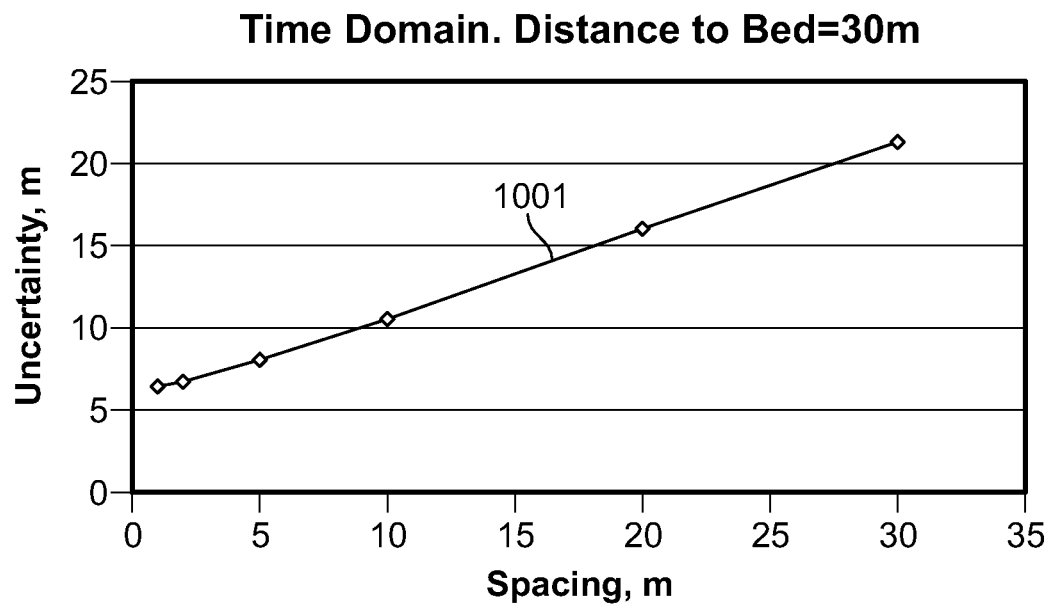
FIG. 10 shows the uncertainty in distance to bed determination with respect to R/T spacing for the remote bed 30 m ahead of the drill bit.

Next, a comparison is made between uncertainties in the distance to bed of short and long spacing transient arrangements. In order to estimate the uncertainty in determining the distance to bed, a linear resolution analysis is used. For the given formation model and some measurement noise level (in the example 2% of the measured signal plus some additive value, which does not depend on the spacing), the uncertainties in the bed boundary position can be calculated. 1001 in FIG. 10 illustrates the uncertainty in the boundary position with respect to the spacing between transmitter and receiver in case of 30 m ahead-placed boundary. The registration time interval is from 0.1 to 1000 µs. As we see from FIG. 10 the short-spaced arrangement has a definite advantage over the long one. At spacing of 1 m the error to the bed boundary is 25% of the error at 30 m R/T spacing.

The linear resolution analysis by itself does not suggest an interpretation method for determining formation parameters of ahead of the bit. It just makes it possible to estimate uncertainty of these parameters, assuming that inversion is performed in the best possible way. At the same time, performing inversion of transient data represents a big challenge and can typically be done only in very limited cases in real time, for example, using a homogeneous formation model.

An embodiment of the present disclosure uses an interpretation method based on approximation of the signal E(t) from a layered formation by a thin conductive sheet with variable longitudinal conductance and depth. Since thin sheet formation model is described by the two parameters only (longitudinal conductivity S and vertical distance H from the transmitter to sheet), the two signals $E(t_1)$, $E(t_2)$ measured at time $t_1$ and $t_2$ correspondingly can be converted into apparent parameters S(t) and H(t), which are representative of the structure of layered formation. These apparent parameters make it possible, in real time, to identify the presence of the geo-electrical boundary ahead of the drill bit. Moreover, in some favorable conditions even several boundaries placed ahead of the drill bit can be identified.

Figure 11:
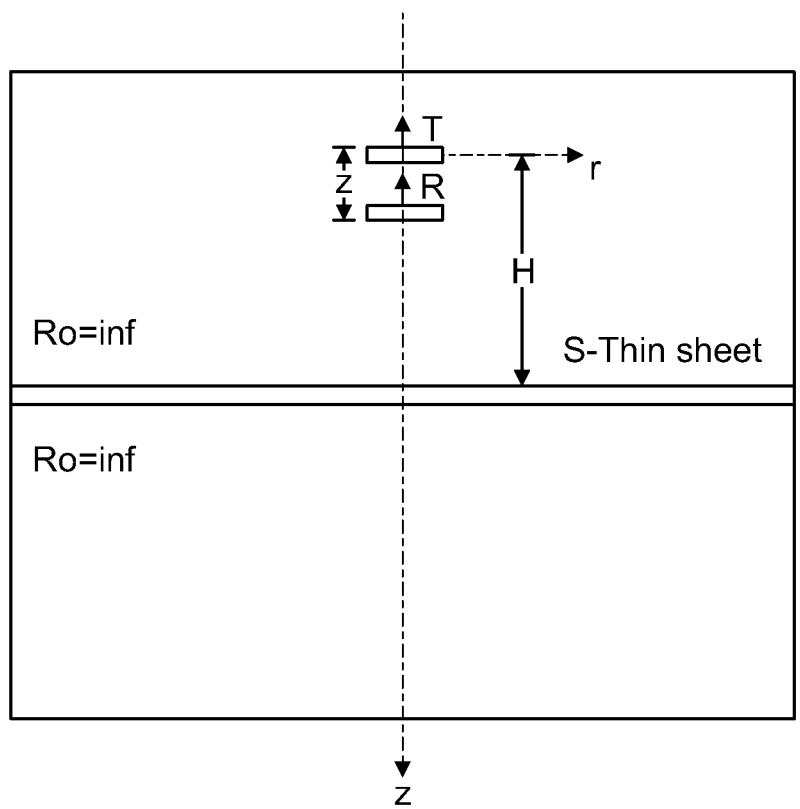
FIG. 11 shows the thin conductive sheet model.

The method is best understood by analyzing expressions for the electromagnetic components induced by a magnetic dipole in the thin sheet. In the analysis, it is assumed that the transmitting dipole is placed at the center of the cylindrical coordinate system T(0,0) and the thin sheet is placed at the depth H from the transmitter (FIG. 11). The coordinates of receiver is R(r, z).

The moment of the transmitting dipole changes instantaneously from $M_T$ to 0 and transient signal is measured at the receiver R(r, z). The expression for the induced azimuthal electric filed in Z-coil has the following form:

$$E_\varphi(t) = \frac{3M_T}{2\pi S} \frac{r(2t/\mu_0 S + 2H - z)}{[r^2 + (2t/\mu_0 S + 2H - z)^2]^{5/2}}. \tag{3}$$

From eqn. (3), the electromotive force in z coil can be derived as:

$$\varepsilon(t) = 2\pi r E_\varphi = \frac{3M_T M_r}{\pi S} \frac{(2t/\mu_0 S + 2H - z)}{[r^2 + (2t/\mu_0 S + 2H - z)^2]^{5/2}} \tag{4}$$

where $M_r = \pi r^2$ is the receiver moment.

In all well logging applications the receiver size r is significantly less than the depth of investigation H, i.e., $r \ll |2t/\mu_0 S + 2H - z|$. This leads to:

$$\varepsilon(t) = \frac{3M_T M_r}{\pi S} \frac{1}{(2t/\mu_0 S + 2H - z)^4} \tag{5}$$

For measurements taken at two time instants $t_1$ and $t_2$ this gives:

$$\begin{cases} \bar{\varepsilon}(t_1) = \frac{3}{\pi S(2t_1/\mu_0 S + 2H - z)^4} \\ \bar{\varepsilon}(t_2) = \frac{3}{\pi S(2t_2/\mu_0 S + 2H - z)^4} \end{cases} \tag{6}$$

where $\bar{\varepsilon}(t) = \varepsilon(t)/(M_T M_r)$—normalized signal. The value of the time difference $\Delta t = t_2 - t_1$ is not critical. A difference of 5% is typical and in general, the difference should be less than 10%.

Solving eqns. (6) gives the longitudinal conductance S and depth H:

$$S = \frac{2}{\mu_0} \left(\frac{2\pi}{3\mu_0}\right)^{1/3} \left[\frac{(t_2 - t_1)}{\left(\frac{1}{\bar{\varepsilon}(t_2)}\right)^{1/4} - \left(\frac{1}{\bar{\varepsilon}(t_1)}\right)^{1/4}}\right]^{4/3} \tag{7}$$

$$H = \frac{1}{\mu_0 S} \frac{t_2 \bar{\varepsilon}(t_2)^{1/4} - t_1 \bar{\varepsilon}(t_1)^{1/4}}{\bar{\varepsilon}(t_1)^{1/4} - \bar{\varepsilon}(t_2)^{1/4}} + \frac{z}{2} \tag{8}$$

One embodiment of the present disclosure uses eqns. (7) and (8) to transform original signal $\epsilon(t)$ into apparent conductance S and apparent depth H. Since a thin sheet is only approximation of the more complicated layered model, the parameters S(t) and H(t) that are varying with time and have the meaning of apparent parameters. At the same time there are some time intervals where S(t) and H(t) are varying slowly and almost do not depend on time. These intervals correspond to the time instants when eddy currents, propagating from the transmitting coil into formation, reach a conductive object situated at some distance H from the transmitter—the equivalent thin sheet is located at depth H(t) and stays at this depth for some period of time unless the eddy currents penetrate through the conductive object deeper into the formation.

Figure 12:
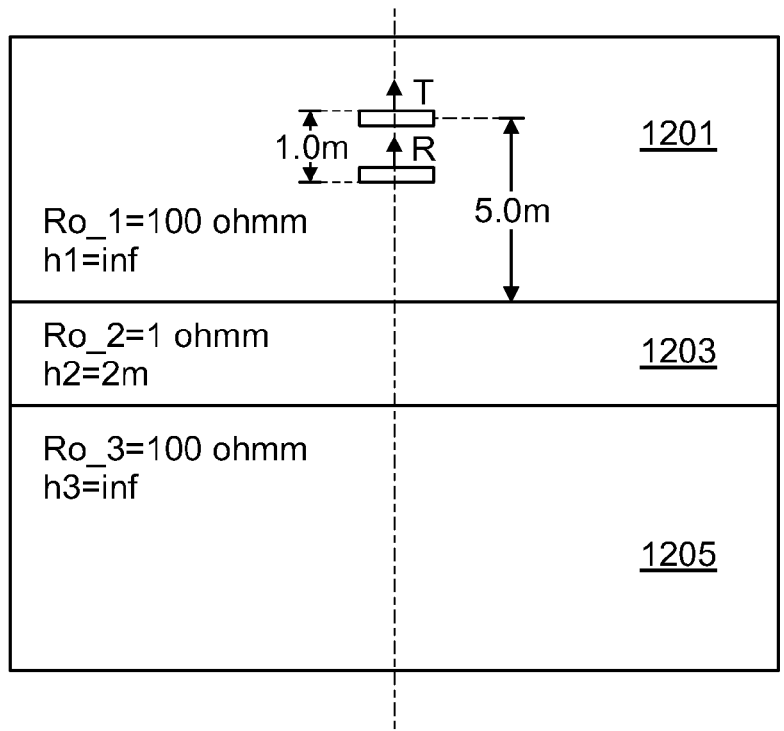
FIG. 12 shows a formation model with one conductive layer surrounded by a homogeneous formation.

To illustrate the effectiveness of an interpretation method based on the thin sheet approximation, apparent parameters S(t) and H(t) are presented for the two models with one (FIG. 12) and two (FIG. 13) conductive layers surrounded by homogeneous formation with resistivity of 100 Ω-m. The model of FIG. 12 has layers 1201, 1203, 1205 of resistivities 100 Ω-m, 1 Ω-m and 100 Ω-m respectively. The model of FIG. 13 has layers 1301, 1303, 1305, 1307 and 1309 with resistivities of 100 Ω-m, 1 Ω-m, 100 Ω-m, 1 Ω-m and 100 Ω-m respectively. The thickness of each conductive layer is 2 m. Distance from transmitter to the upper boundary of the first layer is 5 m, while distance to the boundary of the second layer is 12 m. Transmitter-receiver spacing is 1 m.

Figure 14A:
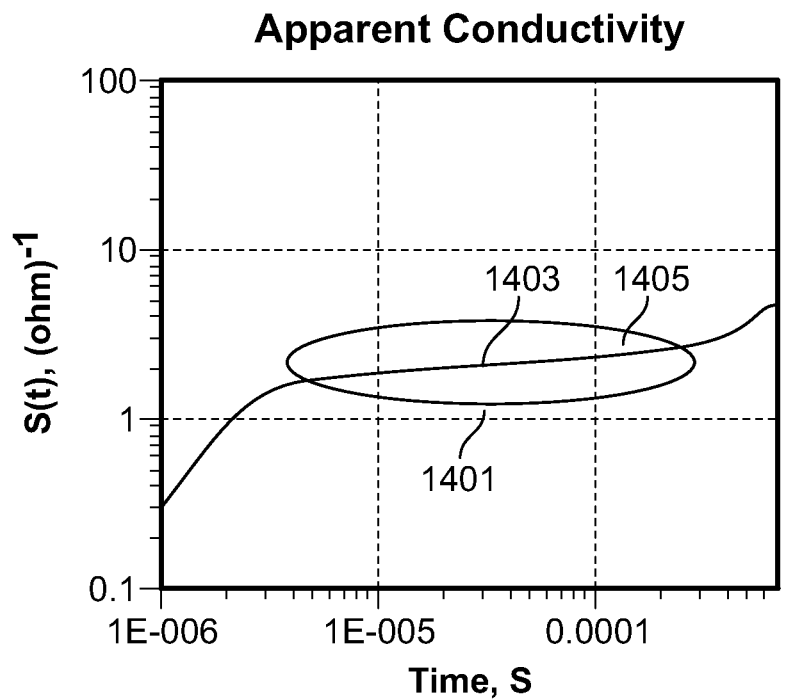
FIG. 14a shows apparent conductivity estimated from measurements on the model of FIG. 12 using a thin conductive sheet approximation.
Figure 14B:
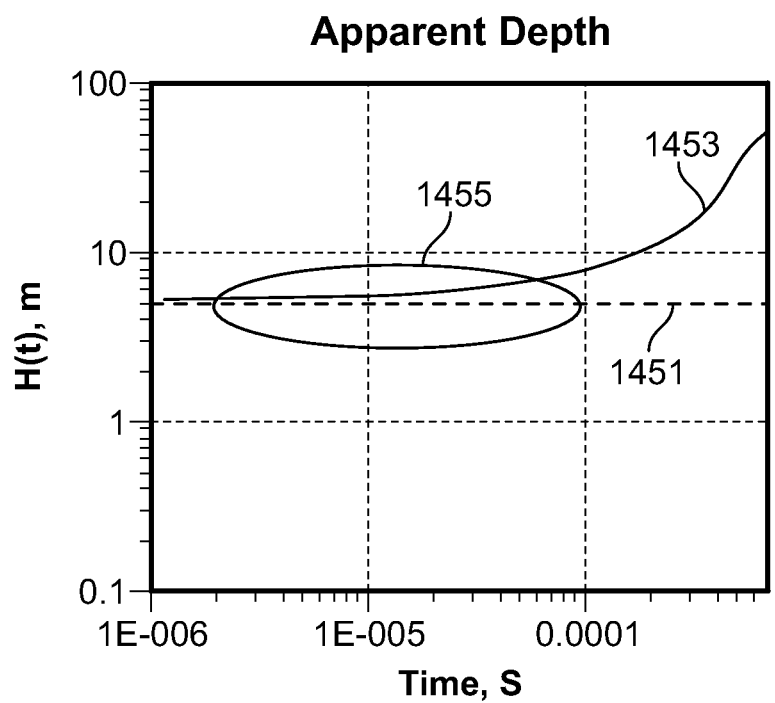
FIG. 14b shows apparent depth estimated from measurements on the model of FIG. 12 using a thin conductive sheet approximation.

In case of the first model (FIG. 12), the apparent conductivity 1403 in FIG. 14l clearly shows a time interval 1405 in which the estimated conductivity remains substantially constant. For the purposes of the present document, keeping in mind the logarithmic scale of the conductivity, the term "substantially constant" may be considered to be a factor of 1.5 between the maximum and the minimum over the interval. The estimated conductivity is also in reasonable agreement with the actual conductivity. corresponding to the position of the equivalent thin sheet in the first layer (FIG. 14a). There is good agreement with the true conductivity of the single thin layer 1401. The apparent depth curve 1453 also has a time interval 1455 wherein the estimated distance to the conductive layer has a substantially constant value. The difference between the true depth 1451 and apparent depth 1453 does not exceed 10% over the region of substantially constant value.

Figure 13:
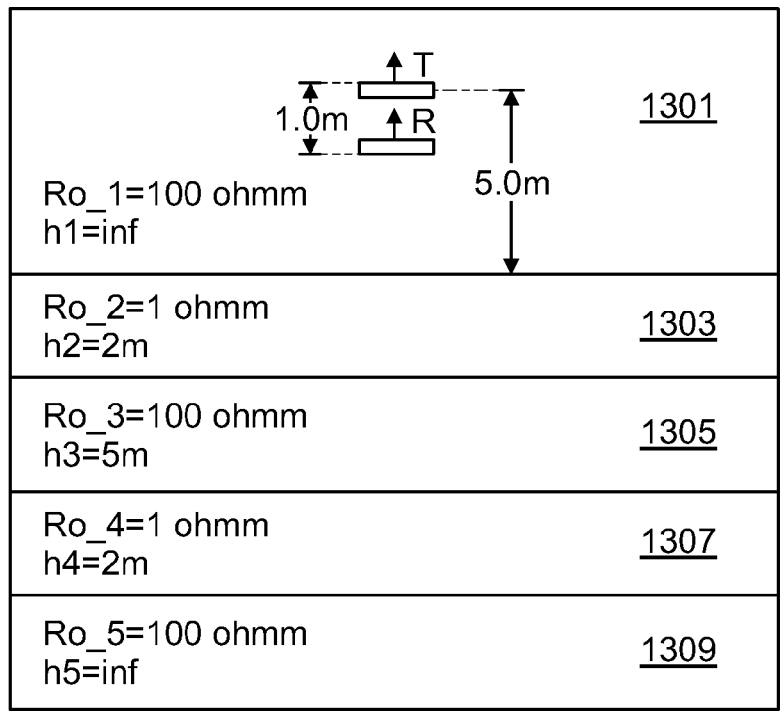
FIG. 13 shows a formation model with two conductive layers surrounded by a homogeneous formation.
Figure 15A:
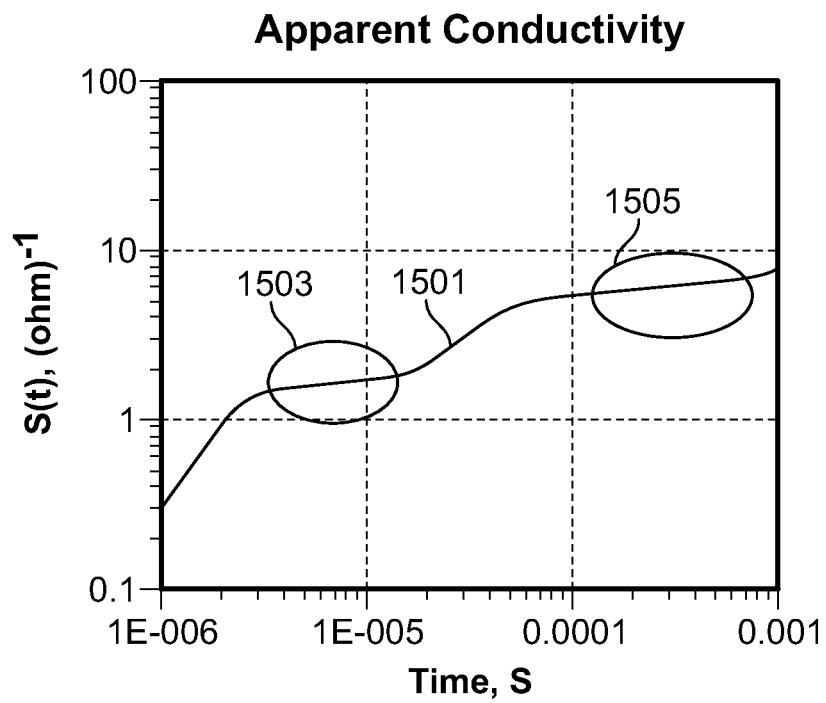
FIG. 15a shows apparent conductivity estimated from measurements on the model of FIG. 13 using a thin conductive sheet approximation.
Figure 15B:
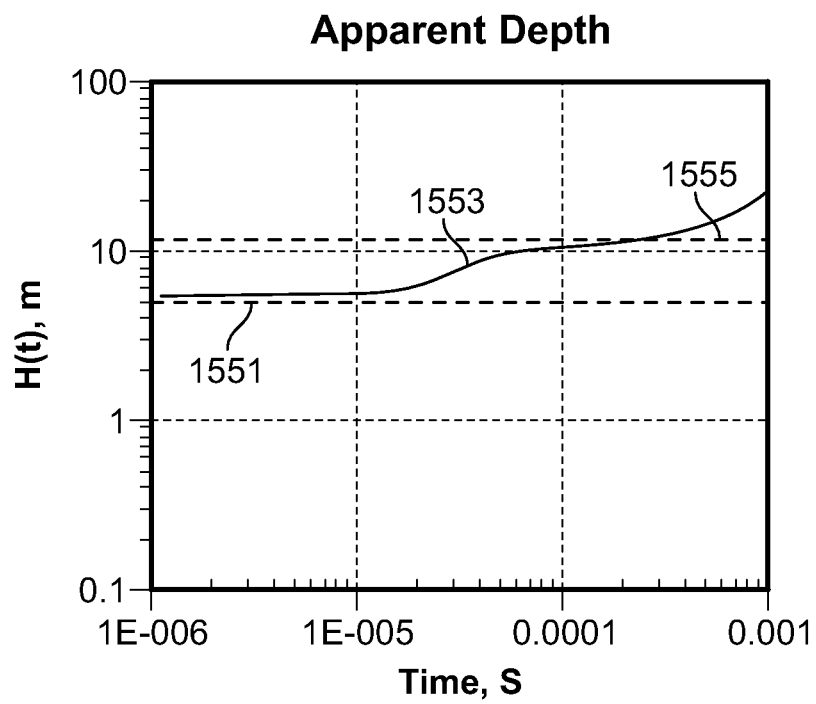
FIG. 15b shows apparent depth estimated from measurements on the model of FIG. 13 using a thin conductive sheet approximation.

Similar results are seen in FIGS. 15a-15b, which corresponds to the case of two conductive layers of the model of FIG. 11. The apparent conductance 1501 shows two intervals of substantially constant value. The first interval 1503 corresponds to the effective conductivity $$S = \frac{H_2}{\rho_2} = \frac{2.0}{1.0} = 2.0 \text{ (ohm)}^{-1}$$

of the layer 1303 in FIG. 13 and corresponds to a time interval when the layer 1303 is responding to the transient pulse generated by the transmitter, The second interval of substantially constant value of apparent conductance 1505 depicts the total conductance of two conductive layers $$S = \frac{H_2}{\rho_2} + \frac{H_4}{\rho_4} = \frac{2.0}{1.0} + \frac{2.0}{0.5} = 6 \text{ (ohm)}^{-1}.$$

The apparent depth curve 1553 has the first substantially constant value very close to the upper boundary 1551 of the first conductive layer (≈5 m), while the second substantially constant value is close to the location 1555 of the second conductive layer (≈11 m). The error in detecting boundaries does not exceed 10%.

Figure 16:
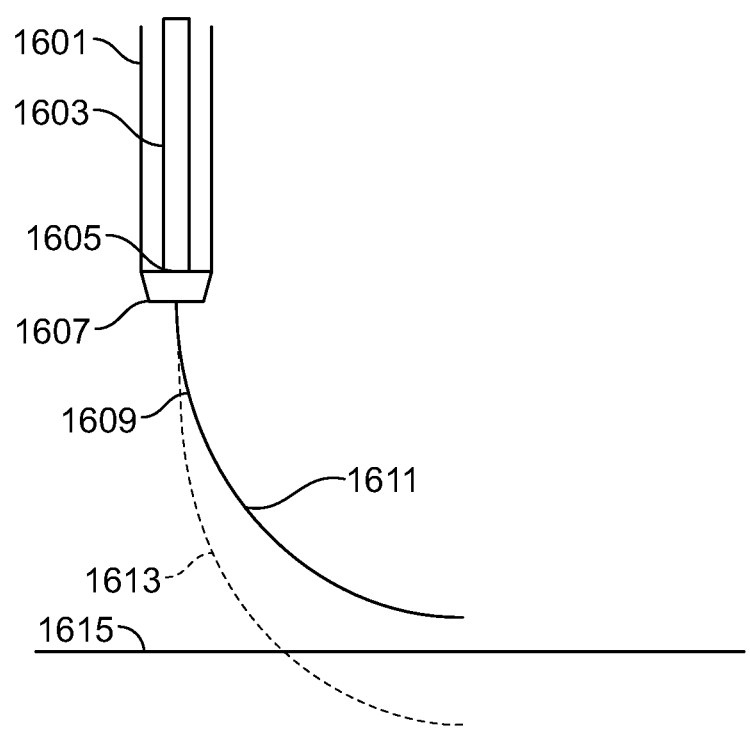
FIG. 16 shows an example of reservoir navigation where deep look-ahead capability is particularly useful.

The methods described above are particularly useful in reservoir navigation. The term "reservoir navigation" as used here refers to the ability to drill into earth formations while maintaining a desired distance from a particular interface. The interface may be a bed boundary with a resistivity contrast or it may be a fluid interface with a resistivity contrast. FIG. 16 shows an example where the deep look-ahead capability discussed above is particularly useful.

Shown in FIG. 16 is a wellbore 1601 being drilled by a drill bit 1605 on a drillstring 1603. It is desired to drill the wellbore to change from a near vertical orientation to a near horizontal orientation parallel to an interface 1615. With the deep look-ahead capability discussed above, once the location of the interface 1615 is determined with the drill bit at a position such as 1607, it is possible to curve the wellbore along the trajectory 1611 as indicated and reach the desired horizontal orientation above the interface 1615.

In the absence of the deep look-ahead capability, the location of the interface 1615 may not be established until the drill bit is at a location such as 1609. From that location, due to constraints on the ability to drill curved borehole, the wellbore would take a trajectory such as 1613 and not be able to reach the desired orientation above the interface 1615.

Successful reservoir navigation thus requires two things. One is the ability to look deep-ahead of the drillbit. The short DTEM tool described above provides this ability. The second is the ability to use the measurements to locate the interface. The thin sheet approximation described above provides the ability to locate the interface in real-time. The term "real time" as used here means that the data can be processed quickly enough to be able to provide meaningful input to the control of the directional drilling process.

A third aspect of reservoir development does not have to be done in real-time. This involves processing of the measurements made by the DTEM tool to get an accurate estimate of the locations of the layer boundaries and conductivities. For this, prior art techniques may be used. These prior art techniques typically involve inversion of the measurements using a model of the subsurface. Those versed in the art and having benefit of the present disclosure would recognize that a good starting estimate of values of the model can significantly speed up the inversion, and may also avoid problems encountered in nonlinear inversion where the iterative inversion converges to the wrong solution. In this regard, the thin conductive sheet approximation provides a good starting point for an inversion procedure. The inversion may be done using a processor at the surface on data recorded downhole and retrieved after the BHA is tripped out of the surface. The surface processor may be referred to as an additional processor. It should be noted that in this disclosure, when reference is made to a resistivity interface, the term is intended to include a conductivity interface, and vice versa.

It should be noted that the thin sheet approximation is not dependent upon the particular tool configuration used in the DTEM tool described above and has general applicability for real-time estimation of distances to a resistivity interface in the earth formation using other TEM tools.

Some or all of the processing may be done by a downhole processor, a processor at the surface, or a processor at a remote location. Implicit in the control and processing of the data is the use of a computer program on a suitable machine readable medium that enables the processor to perform the control and processing. The machine readable medium may include ROMs, EPROMs, EEPROMs, Flash Memories and Optical disks. The disclosure may also be implemented in conjunction with a measurement-while-drilling arrangement in which the multi-component and multi-array measurements are made using a suitable device on a bottomhole assembly conveyed on a drilling tubular such as a drillstring.

What is claimed is:

1. An apparatus for evaluating an earth formation comprising:
   a carrier configured to be conveyed in a borehole;
   a transmitter on the carrier configured to produce a transient electromagnetic field in the earth formation;
   a receiver on the carrier positioned at a first distance from the transmitter configured to produce a first transient signal responsive to an interaction of the electromagnetic field with the earth formation, the first signal being affected by a resistivity interface at a second distance at least five times the first distance from the transmitter; and a processor configured to estimate a value of the second distance using the first transient signal, wherein estimating the value of the second distance comprises modeling the earth formation by replacing the earth formation with a thin conductive sheet having a depth that changes over time.

2. The apparatus of claim 1, wherein the first distance is less than 5 m.

3. The apparatus of claim 2 further comprising a drilling tubular configured to convey the carrier into the borehole.

4. The apparatus of claim 1, wherein the processor is further configured to use a time interval that lies between 10 μs and 10 ms to estimate the value of the second distance.

5. The apparatus of claim 1, wherein the transmitter further comprises an axially oriented coil and the receiver further comprises an axially oriented coil.

6. The apparatus of claim 1, wherein the processor is further configured to estimate the value of the second distance in real time.

7. The apparatus of claim 1 wherein the thin conductive sheet has a longitudinal conductance that changes over time; and wherein the depth of the thin conductive sheet is a distance between the transmitter and the thin conductive sheet.

8. The apparatus of claim 1 wherein the processor is further configured to control a direction of drilling of a drill bit on a bottomhole assembly using the estimated value of the second distance.

9. The apparatus of claim 1 further comprising a device for recording on a memory device the signal produced by the receiver; and wherein at least one of: (i) the processor, and (ii) an additional processor, is used for estimating a location of a layer and value of a conductivity of the layer in the earth formation after the memory device has been tripped out of the wellbore.

10. A method of evaluating an earth formation comprising:
using a transmitter on a carrier in a borehole for producing a transient electromagnetic field in the earth formation;
using a receiver on the carrier positioned at a first distance from the transmitter for producing a first transient signal responsive to an interaction of the electromagnetic field with the earth formation, the first signal being affected by a resistivity interface at a second distance at least five times the first distance from the transmitter; and
using a processor to estimate a value of the second distance using the first transient signal, wherein estimating the value of the second distance comprises modeling the earth formation by replacing the earth formation with a thin conductive sheet having a depth that changes over time.

11. The method of claim 10, further comprising positioning the transmitter less than 5 m from the receiver.

12. The method of claim 10, further comprising using a time interval within 10 μs and 10 ms for estimating the value of the second distance.

13. The method of claim 10, further comprising using, for the transmitter, a transmitter having an axially oriented coil and using, for the receiver, a receiver with an axially oriented coil.

14. The method of claim 10, further comprising estimating the value of the second distance in real time.

15. The method of claim 10 wherein the thin conductive sheet has a longitudinal conductance that changes over time; and wherein the depth of the thin conductive sheet is a distance between the transmitter and the thin conductive sheet.

16. The method of claim 10 wherein the processor is further configured to control a direction of drilling of a drill bit on a bottomhole assembly using the estimated value of the second distance.

17. The method of claim 10 further comprising:
recording on a memory device the signal produced by the receiver; and
using at least one of: (i) the processor, and (ii) an additional processor for estimating a location of a layer and value of a conductivity of the layer in the earth formation after the memory device has been tripped out of the wellbore.

18. A non-transitory computer-readable medium product having stored thereon instructions that when read by a processor cause the processor to execute a method of evaluating an earth formation, the method comprising:
using a transmitter on a carrier in a borehole for producing a transient electromagnetic field in the earth formation;
using a receiver on the carrier positioned at a first distance from the transmitter for producing a first transient signal responsive to an interaction of the electromagnetic field with the earth formation, the first signal being affected by a resistivity interface at a second distance at least five times the first distance from the transmitter; and
estimating a value of the second distance using the first transient signal, wherein estimating the value of the second distance comprises modeling the earth formation by replacing the earth formation with a thin conductive sheet having a depth that changes over time.

19. The non-transitory computer-readable medium product of claim 18 further comprising at least one of: (i) a ROM, (ii) an EPROM, (iii) an EEPROM, (iv) a flash memory, or (v) an optical disk.

* * * * *